United States Patent [19]

Dopheide et al.

[11] Patent Number: 4,997,272
[45] Date of Patent: Mar. 5, 1991

[54] $4\pi$ LASER DOPPLER ANEMOMETER (LDA) FOR MEASURING THE VELOCITIES OF MOVING OBJECTS

[75] Inventors: Dietrich Dopheide; Michael Faber; Gerhard Reim; Günter Taux, all of Braunschweig, Fed. Rep. of Germany

[73] Assignee: IWK Regler und Kompensatoren GmbH, Stutensee, Fed. Rep. of Germany

[21] Appl. No.: 326,981

[22] Filed: Mar. 22, 1989

[30] Foreign Application Priority Data

Mar. 25, 1988 [EP] European Pat. Off. .......... 88104807

[51] Int. Cl.⁵ .............................. G01P 3/36; G01B 9/02
[52] U.S. Cl. ........................................ 356/28.5; 356/345
[58] Field of Search ............... 356/5, 28, 28.5, 345, 356/349

[56] References Cited

U.S. PATENT DOCUMENTS

| | | | |
|---|---|---|---|
| 3,895,872 | 7/1975 | Dandliker et al. | 356/28 |
| 4,373,807 | 2/1983 | Gouesbet | 356/28.5 |
| 4,397,550 | 8/1983 | Matsuda et al. | 356/28.5 |
| 4,537,503 | 8/1985 | Liu | 356/28.5 |
| 4,537,507 | 8/1985 | Hess | 356/28.5 |
| 4,540,283 | 9/1985 | Bachalo | 356/28.5 X |
| 4,551,018 | 11/1985 | Mannava et al. | 356/28.5 |
| 4,725,136 | 2/1988 | McCullough et al. | 356/28 |
| 4,807,990 | 2/1989 | Keefer | 356/28.5 |
| 4,843,564 | 6/1989 | Jenson | 356/28 X |

Primary Examiner—Linda J. Wallace
Attorney, Agent, or Firm—Antonelli, Terry, Stout & Kraus

[57] ABSTRACT

Laser Doppler anemometer with a wavelength-stabilized laser diode (1) whose beam after splitting (7) is so concentrated in a definite area (9) of a particle-containing flow of a fluid with the velocity (17) that in this area (9) an interference fringe pattern is produced, and with at least one semiconductor photodiode (13) on which the laser beams (10, 11) progressing from the area (9) are refocussed after elimination of scattered light fractions by a scattered light trap (diaphragm stop) (14), for the detection of the difference signal I between incident light intensity $I_o$ and scattered light intensity $I_{scatter}$ which the particles contained in the fluid emit into the whole solid angle $4\pi$, where $I = I_o - I_{scatter}$. By detection of the laser beam of the intensity I which is modulated with the Doppler frequency after having passed through the point of measurement (9), the whole light intensity $I_{scatter}$ emitted by the particle into the solid angle $4\pi$ can be utilized for the signal-to-noise ratio at the photodetector, and if suitable semiconductor photodiodes are used, the direction of flow can be identified.

11 Claims, 8 Drawing Sheets

4π LASER DOPPLER ANEMOMETER (LDA) FOR MEASURING THE VELOCITIES OF MOVING OBJECTS

BACKGROUND OF THE INVENTION

The invention relates to a laser Doppler anemometer with a wavelength-stabilized laser diode whose laser beam, after beam splitting, is concentrated in a certain area (measuring range) of a particle-containing flow of a fluid in such a way that an interference fringe pattern is produced in this area, and at least one photodetector for the detection of the two laser beams passing through and beyond the above-mentioned measuring range.

The invention starts from a laser Doppler anemometer as it is known from DE-OS No. 34 35 423. As compared with all other proven methods of laser Doppler anemometry, the present principle of measurement which remains to be described offers the advantage that the interaction between transmitter and receiver will be so optimized that at both the transmitting and receiving end the most inexpensive semiconductor components can be used even for extremely difficult measurement problems which have hitherto not been mastered. According to prior art, two partial beams of the same laser diode are superimposed in the area of a flowing fluid to be investigated in such a way that an interference fringe pattern is produced. If the wavelength of the laser diode is constant—which is to be ensured—, this interference fringe pattern will be stable and stationary.

The spacing of the intensity maxima of the interference fringe pattern is a function of the laser wavelength and the angle of intersection between the two laser beams in the measuring range.

A particle contained in a flowing fluid passing through this interference fringe pattern produces scattered light emissions with the intensity $I_{scatter}$ into the whole solid angle 4π whose modulation frequency (Doppler frequency) is proportional to the particle velocity.

In the case of the conventional known LDA method, a receiving lens system focusses only a small part of the scattered light emitted into the whole solid angle 4π on the photodetector which registers the Doppler frequency with more or less large signal-to-noise ratios depending on the amount of the scattered light power. When the Doppler frequency is determined by this known conventional LDA method, difficulties are particularly encountered when no sufficiently high scattered light intensity is registered, as the signal-to-noise ratios then become very small. This is particularly the case when the distance from the point of measurement is very great, as the apertures of the receiving lenses then confine the solid angle within which the scattered light is received, and when the particle sizes are of the order of micrometers or less, as these emit for physical reasons only a small amount of scattered light.

The idea underlying the new LDA method of measurement (4π LDA) which is the object of the invention is to utilize for the receiving signals the whole scattered light power $I_{scatter}$ emitted into the solid angle 4π. Accordingly, considerably better signal-to-noise ratios can be achieved than by the conventional LDA method, as only a fraction of the overall scattered light intensity contributes to the signal-to-noise ratio.

For the measurement of the flow velocity of a fluid also under the above-mentioned conditions (e.g. great distance from the point of measurement, smallest particles), with a simultaneous drastic cost reduction and miniaturization of an LDA measuring apparatus, the invention provides the determination of the velocity information directly from the differential intensity I between the laser beam intensity $I_o$ and the scattered light intensity $I_{scatter}$ emitted into the whole solid angle 4π, the relationship $I = I_o - I_{scatter}$ being valid.

BRIEF DESCRIPTION OF THE INVENTION

The task underlying the invention thus is to design a laser Doppler anemometer of the type mentioned above in such a way that the most inexpensive components can be used even under most difficult conditions of measurement, the receiving properties being at the same time optimized.

According to the invention, this task is solved by focussing the partial beams progressing from the measuring range (point of intersection of the two partial laser beams) at the receiving end with the aid of an optical device directly on a suitable photodetector and eliminating at the same time scattered light fractions. The photodetector then registers the incident differential light intensity I, the relationship $I = I_o - I_{scatter}$ being valid for the intensity received.

The output signal of the photodetector consists of a DC component ($I_o$) which is superimposed by an AC component ($I_{scatter}$). The latter component of the intensity $I_{scatter}$ is the scattered light power scattered by the particle into the whole solid angle 4π so that the detector registers a measuring signal with good signal-to-noise ratio.

The DC component mentioned which is registered by the detector can be used for the automatic and optimized adjustment of the photodetector through an XYZ traversing slide of the detector with electronic control circuit.

According to what has been described above, the decisive difference from the conventional LDA method and the idea underlying the invention is that the detector measures the whole scattered light emitted into the solid angle 4π. With all other LDA methods hitherto known, this has basically not been possible. The scattered light issuing from the particle is kept away from the photodetector by a diaphragm stop, and only the laser light beams pass through the diaphragm stop on to the photodetector.

In an extremely advantageous embodiment of the invention it is possible with the aid of a suitable lens system to focus each individual partial beam progressing from the point of measurement on a separate photodetector ("two-detector 4π LDA"). Each detector then receives a DC signal component corresponding to the intensity of the partial laser beam and a superimposed AC signal component whose modulation frequency (Doppler frequency) is proportional to the velocity of a scattered particle in the point of measurement.

Here the intensity of the AC signal component again corresponds to the scattered light intensity which a scattered particle has scattered in the point of measurement from the intensity of the incident partial laser beam into all spatial directions.

Each detector signal can be independently amplified and then summed up again in an adding stage to form a signal.

The advantage of the arrangement of two detectors according to the invention consists in that an improvement of the signal-to-noise ratio in the velocity-proportional AC signal is achieved in a simple way, for part of the statistically independent signal components (i.e. noise components) in the two detector signals cancel out when added, whereas the AC signal components add up in proper phase relation.

Another embodiment of the receiving end the $4\pi$ LDA allows the velocity and the direction of a flow to be simultaneously measured ("$4\pi$ LDA with direction detection").

When the laser beams progressing from the point of measurement are themselves directly refocussed in the way described above on a suitable photodetector with two separate photosensitive surfaces arranged at a small distance from each other and when this photodetector is so adjusted that each of the halves of the interference fringe pattern is imaged on one of the detector surfaces, a corresponding Doppler signal is generated first on one and then on the other photosensitive surface, according to the flight direction of a particle passing through the point of measurement.

When a suitable logic is used, it is then possible to produce a unique directional signal from the signals of the two photosensitive detector surfaces, and when a suitable adding unit is used at the same time, to obtain the desired velocity information.

The method is suitable both for the conventional LDA technique and for the differential detection technique described. Furthermore, it is possible in the latter case to use the DC components of the detector signals for the optimum adjustment of the detector.

By another potential arrangement according to the invention it is also possible in an advantageous way to measure a velocity component of a flow parallel to the optical axis.

To measure this velocity component, according to prior art, a laser beam of a laser diode is superimposed on itself in the measuring range in such a way that an interference fringe pattern is produced perpendicular to the optical system axis.

In contrast to the prior art, the laser beam is, however, now deflected after having passed through the measuring range and reflected into said range at a certain angle and then focussed directly on a photodetector in the above-described way. A usable laser diode must meet the well-known requirements of wavelength stability and additionally the condition of an adequate coherence length, i.e. a coherence length corresponding to the path of the laser beam from the measuring range to the point of deflection and back into the measuring range.

A particle of a flowing fluid passing through an interference fringe pattern again produces scattered light emissions into the whole solid angle $4\pi$, whose modulation frequency (Doppler frequency) is proportional to the particle velocity.

Under the condition that the coherence of the laser diode light is adequate, the above-mentioned laser beam focussed on the photodetector then will embody the velocity information as a difference signal from the incident light intensity $I_o$ and the scattered light intensity $I_{scatter}$ emitted into the whole solid angle $4\pi$ as an AC component superimposed on a DC component if the transit time of a particle from the v-th to the (v+1)th interference fringe is longer than the transit time of the laser light from the measuring range to the point of deflection and back into the measuring range so that $$\frac{\Delta x}{V_z} \text{ must be } >> \frac{1}{c} \text{ or } V_z << \frac{x}{1} \cdot c$$

where $\Delta x$ = interference fringe spacing $V_z$ = velocity component of a particle along the optical axis $1$ = path of the laser beam from the point of measurement to the point of deflection and back to the point of measurement $c$ = velocity of light The DC component of the photodetector signal can again be used for the optimum adjustment of the detector through, for example, an electronic control circuit controlling an XYZ traversing slide.

By suitable combination of the above-mentioned arrangements it is possible in a simple way to simultaneously measure three orthogonal velocity components of a flow at only one laser wavelength ("three-component $4\pi$ LDA"). For this purpose, two "$4\pi$ laser Doppler anemometers" can be arranged orthogonal to each other and an arangement as described above can be added for the measurement of a velocity component in the system axis.

Furthermore, for the two first-mentioned components, photodetectors with two separate photosensitive surfaces as described above can be used for additional direction detection.

The advantage of this combination is its versatility as well as the compact and simple design and its ease of adjustment and the fact that only one wavelength is required for the measurement of all three velocity components. While maintaining the advantages described above, an advantageous extension of the application of the "two-detector $4\pi$ LDA" is achieved by additionally using suitable deflection and expansion lens systems so that velocity measurements over long distances which cannot be covered by the conventional LDA technique are possible.

In another embodiment of the invention, small openings in a wall delimiting the flow are sufficient to focus the laser beams in the flow and to measure the flow velocities by means of the arrangement of the scattered light difference detection. Here the transmitting and receiving lens systems can be replaced by suitable refractive elements inserted into the openings of the wall.

Owing to the orthogonal arrangement of two "$4\pi$ laser Doppler anemometers", which is made possible by the invention, and the use of a four-quadrant photodetector module at the receiving end, two orthogonal velocity components and at the same time also the directions of the velocities are simultaneously measured with one detector according to the arrangement "$4\pi$ LDA with direction detection" described above.

The particular advantage of the invention and the idea underlying the invention is that the detection of the scattered light over the whole solid angle $4\pi$ results in a decisive improvement of the signal-to-noise ratios of the receiving signals, whereby the use of most inexpensive transmitting and receiving elements is made possible, and at the same time signals from smallest scattered particles can be received, which raises difficulties particularly with the conventional LDA method.

BRIEF DESCRIPTION OF THE DRAWINGS

In the following, the invention will be elucidated in more detail by the embodiments shown in the drawings.

DETAILED DESCRIPTION OF THE INVENTION

Figure 1:
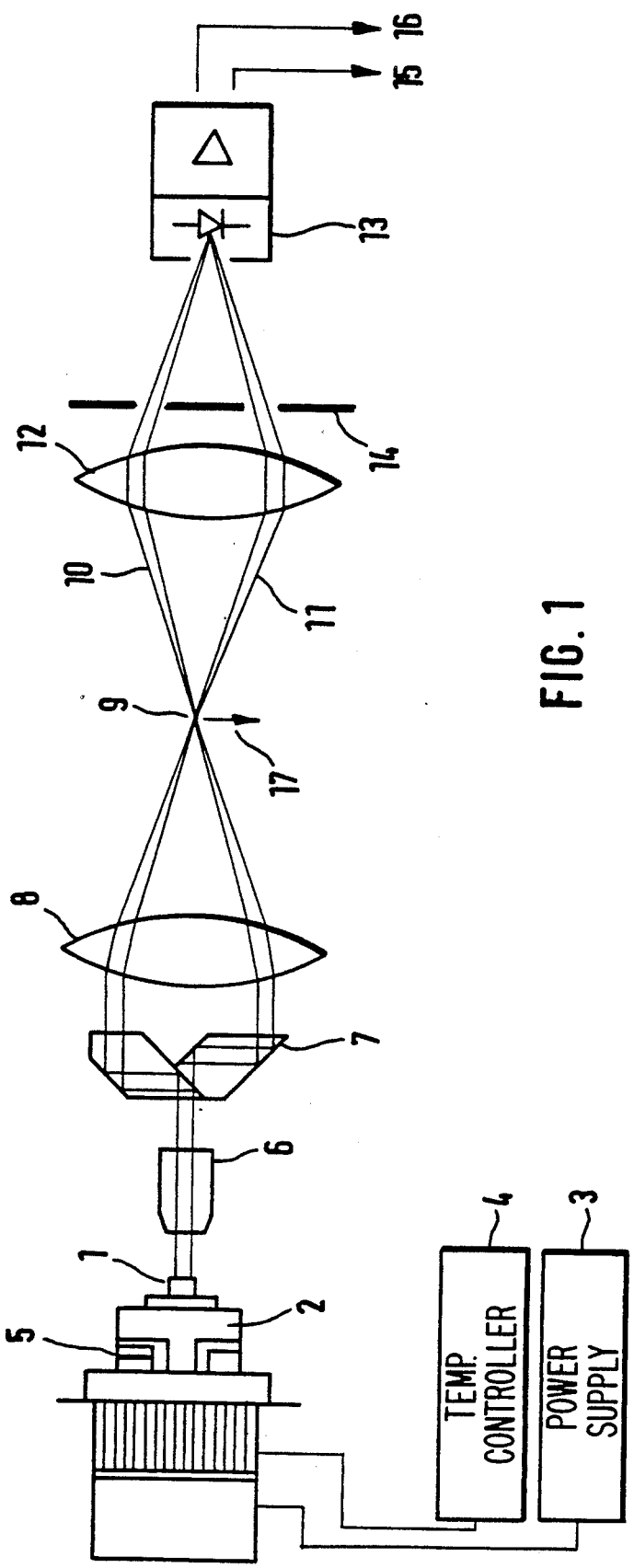
FIG. 1: shows the schematic set-up of a laser Doppler anemometer according to the invention with a laser diode used as laser beam source and with partial beams directly refocussed on a suitable photodetector.

In the basic arrangement shown in FIG. 1, a laser diode 1 is mounted on a mounting block 2 and the laser beam produced there is wavelength-stabilized by the power supply unit 3 and the temperature controller 4 through a Peltier element 5.

By means of a focussing lens system 6 the light emitted by the laser diode 1 is focussed through a beam splitter 7 and a lens 8 on a point of measurement 9. At the point of measurement a fringe system is produced as it is created by a laser Doppler anemometer such as that disclosed in DE-OS-No. 34 35 423.

The laser beams 10 and 11 are refocussed through a lens 12 on a photodetector 13.

If particles of the flow velocity v (17) which are entrained by the fluid pass through the point of measurement 9, the light scattered by these will be trapped by a scattered light trap (diaphragm stop) 14. By a photodetector 13, an AC signal component 15 and a DC signal component 16 can then be picked off. The DC signal component 16 is used for the precise adjustment of the photodetector 13. It is superimposed by an AC component 15 which embodies the velocity information in the form of a modulation frequency (Doppler frequency) as difference signal between the incident light intensity $I_o$ and the scattered light intensity $I_{scatter}$ emitted in the point of measurement into the whole solid angle $4\pi$. The intensity I registered by the photodetector 13 thus is $I = I_o - I_{scatter}$, the intensity I being modulated with the Doppler frequency which is well known in the LDA technique and embodies the velocity information sought.

Figure 2:
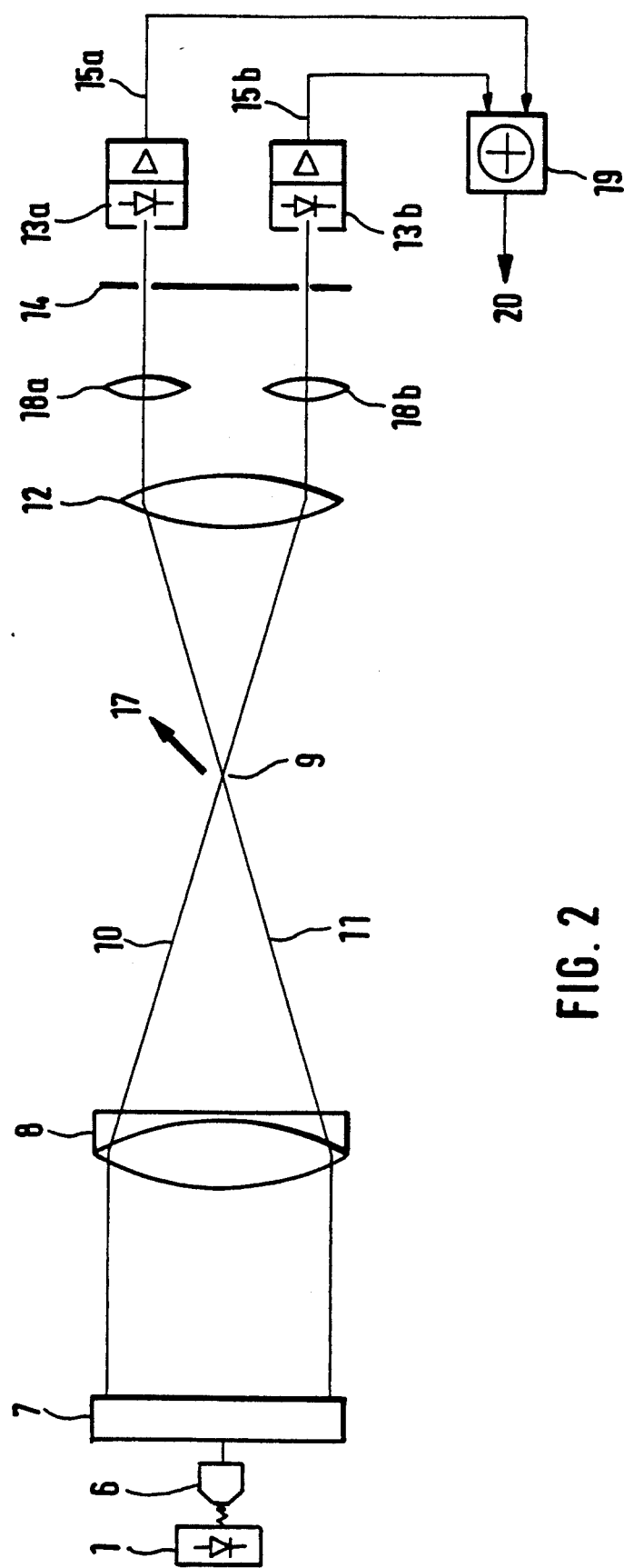
FIG. 2: shows an arrangement of a laser Doppler anemometer similar to FIG. 1 with refocussing of each individual partial beam on its own separate photodetector to improve the signal-to-noise ratio (SNR).

FIG. 2 shows an extension of the arrangement represented in FIG. 1. The extension consists in that the two partial laser beams 10 and 11 which have passed through the point of measurement 9 are deflected with the aid of the lens system 12 and are separately focussed, each with another lens system 18a and 18b, on a semiconductor photodiode 13a and 13b. A scattered light-proof diaphragm stop 14 prevents the incidence of scattered light on the detectors 13a, 13b and allows only the beams 10 and 11 to pass.

Each photodiode receives a DC signal which is a function of the intensity of the incident partial beam, and a superimposed AC component which is caused by the scattering of light into the solid angle $4\pi$ of the particles in the measurement volume (point of measurement) 9 and embodies the velocity information.

Each detector signal of the photodiodes 13a and 13b is separately electrically amplified and subsequently added with the adding stage 19 to form the composite signal 20. The advantage of the use of two separate detectors is that in the adding stage part of the statistically independent signal components (noise) cancel out, whereas the AC signal components add up in proper phase relation.

Figure 3:
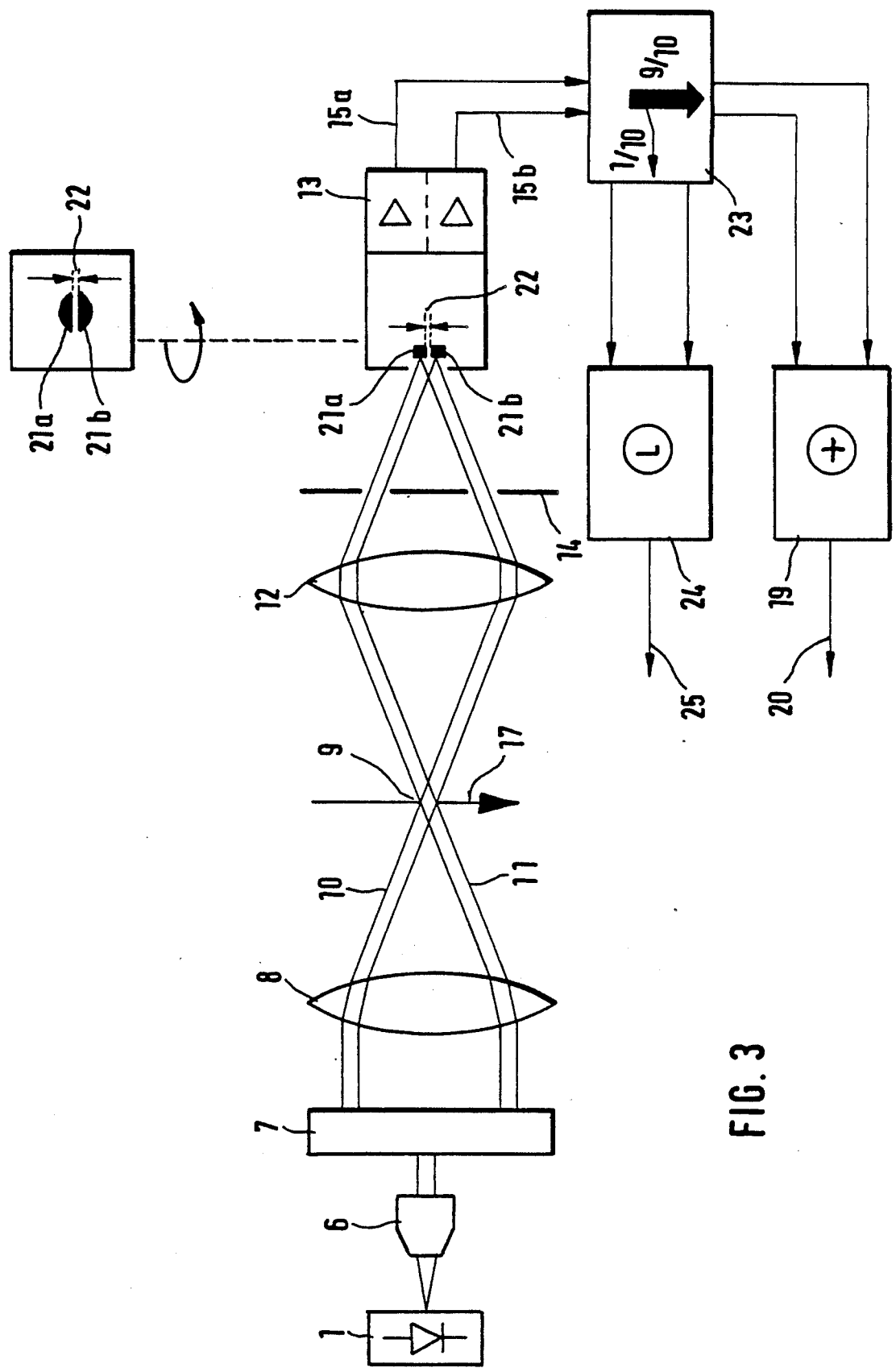
FIG. 3: shows an arrangement of a laser Doppler anemometer similar to FIG. 1, with refocussing of the partial beams on a suitable photodetector with photosensitive surfaces for the additional acquisition of the direction information.

FIG. 3 shows a variant of the arrangement represented in FIG. 1.

The laser beams 10 and 11 progressing from the point of measurement 9 are refocussed via a lens system 12 on a photodetector module 13 consisting of a photodiode with two photosensitive surfaces 21a, 21b, with a small spacing 22 in between, and integrated signal amplifiers for each photosensitive surface.

If a particle contained in the flowing fluid flies through the point of measurement 9 with the velocity v (17), it scatters there light into the whole solid angle $4\pi$. In the embodiment represented, this scattered light is trapped with respect to a photodetector 13 by a scattered light trap 14 so that the desired information on the flow velocity v (17) is now available as an AC component, which is superimposed on a DC component and represents the above-described difference signal 1 between the incident light intensity $I_o$ and the scattered light intensity $I_{scatter}$, in the form of the signals 15a, 15b of the corresponding photosensitive surfaces 21a, 21b of the photodetector module 13.

According to the flight direction of a particle through the point of measurement 9, the signals 15a, 15b now appear in a modified temporal order, i.e. at intervals staggered in time, so that an identification of the direction of the flow is possible.

In the embodiment represented, via a directional coupler 23, the signals 15a, 15b are applied to a logic 24 which detects the above-mentioned temporal order of the signals 15a and 15b and outputs them as direction signal 25, and to an adding unit 19 which adds the signals 15a and 15b, which have passed through the directional coupler 23, to form the velocity signal 20.

Figure 4:
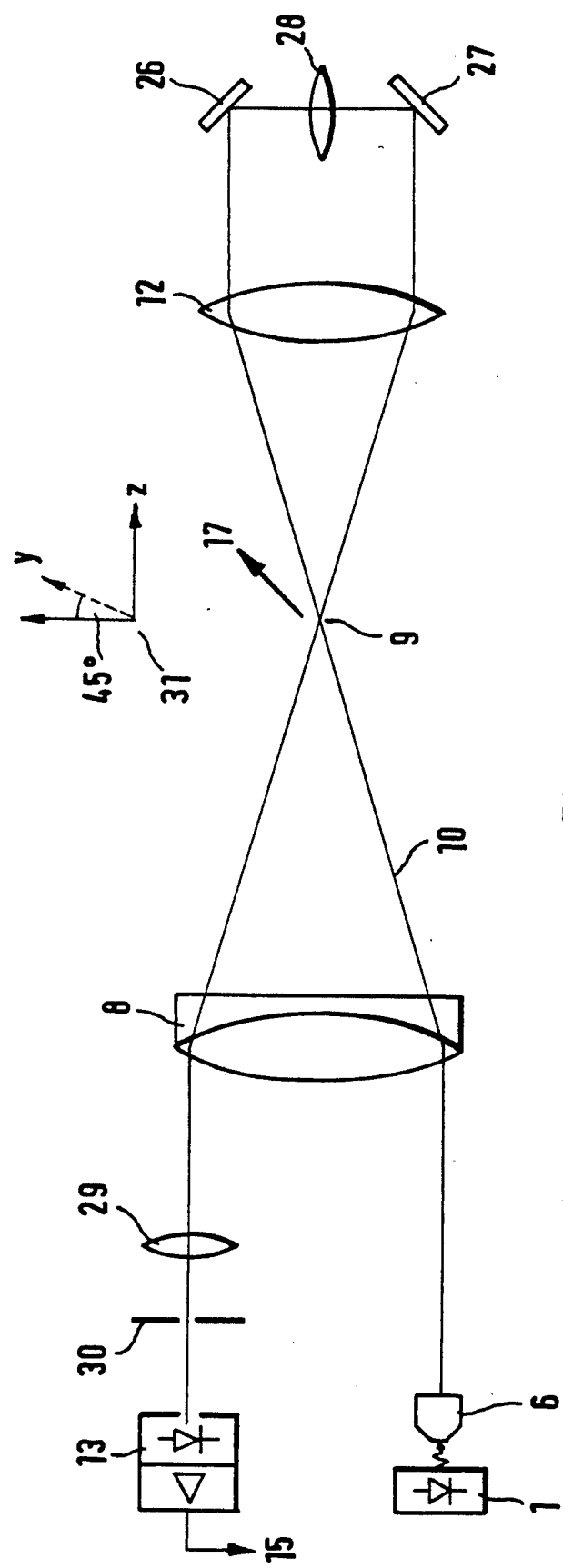
FIG. 4: shows the schematic set-up for the arrangement of a laser diode outside the optical axis for the measurement of a velocity component situated in the optical axis (system axis) and direct refocussing of the laser beam on a photodetector.

FIG. 4 shows the embodiment for the measurement of a velocity component parallel to optical axis z. The light emitted by a laser diode 1 is focussed with a focussing lens system 6 through a lens 8 into the point of measurement 9. After the beam 10 of the laser diode 1 has passed through the point of measurement 9, the beam 10 is reflected to the point of measurement 9 with a lens 12 and two reflecting mirrors 26, 27 and focussed in the point of measurement 9 with the aid of a lens 28. A fringe system is then produced in the point of measurement 9 perpendicular to the axis z of a system of coordinates 31. The direction of the z-axis is the optical axis (system axis).

After its return trip through the point of measurement 9, the laser beam 10 is guided via a lens 8 parallel to the z-axis of the system of coordinates 31 and focussed with a lens 29 on a photodector 13. The scattered light trap 30 serves to eliminate scattered light.

If particles entrained by the fluid pass through the point of measurement 9 with the flow velocity v (17), in relation to the system of coordinates 31, the velocity component $V_z$ can be measured in the z-direction of the velocity vector v (17) of a particle exactly when the light of the laser diode 1 shows a coherence length $I_c$ which is greater than the path 1 covered by the laser beam 10 from the point of measurement 9 through the lens 12 and the reflecting mirrors 26, 27 and back to the point of measurement 9.

The photodetector 13 then generates signal 15 which embody the velocity information as difference signal I between the incident light intensity $I_o$ and the scattered light intensity $I_{scatter}$ emitted into the whole solid angle $4\pi$, where $I = I_o - I_{scatter}$. As in this case the interference fringe system is perpendicular to the z-direction, the scattered light I which the detector 13 receives is modulated with the Doppler frequency which corresponds to the velocity component $V_z$ in the z-direction, i.e. in the direction of the optical axis.

A DC component for the precise positioning of a photodetector 13 can be taken from the signal 15.

Figure 5:
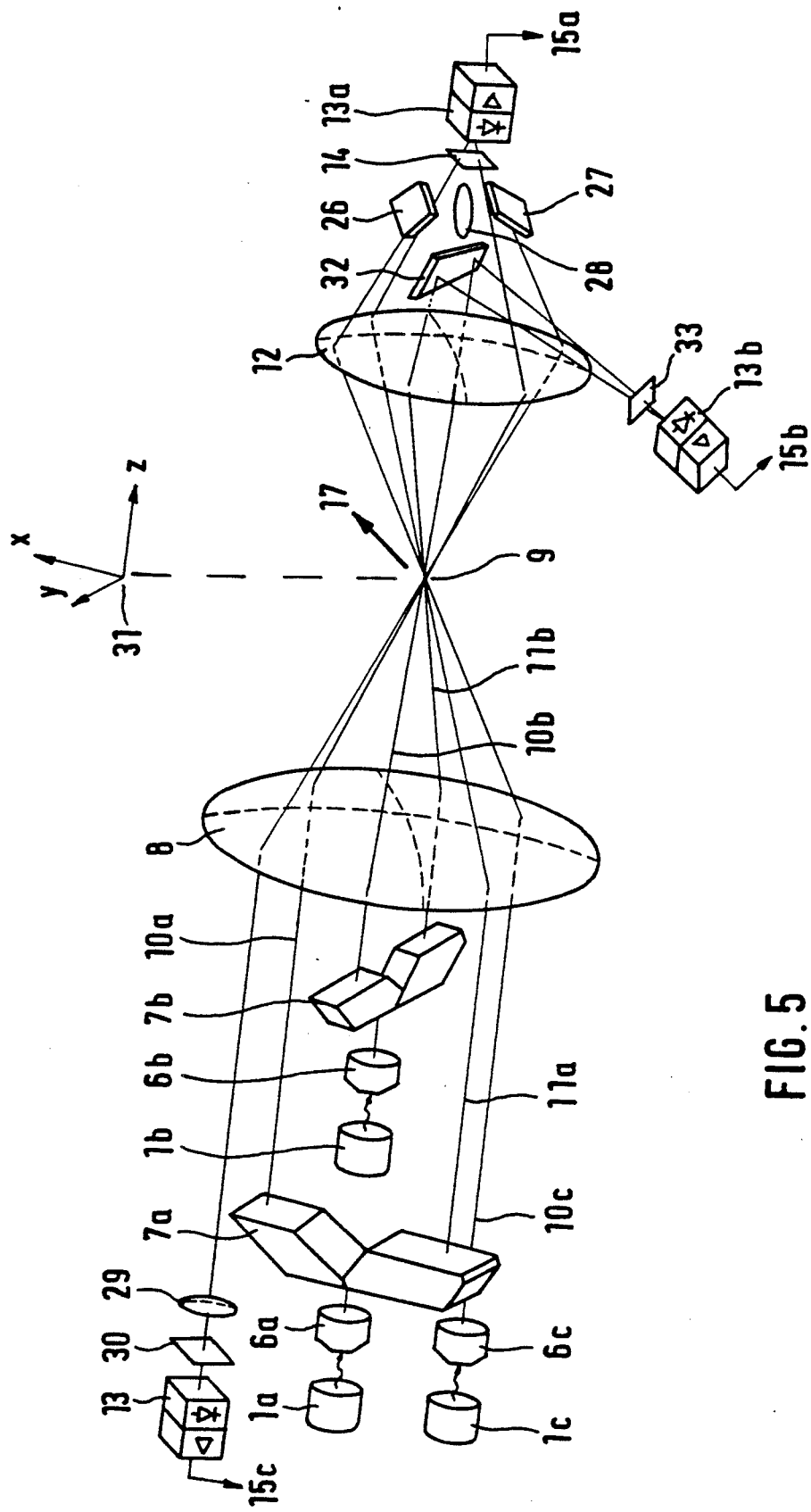
FIG. 5: is a schematic representation of an arrangement for the measurement of three orthogonal velocity components similar to FIG. 1 and FIG. 4 at one wavelength.

FIG. 5 shows a suitable combination of the arrangements according to FIG. 1 and FIG. 4 for the measurement of three orthogonal velocity components.

The light emitted by the laser diodes 1a, 1b is focussed by focussing lens systems 6a, 6b through beam splitters 7a, 7b arranged orthogonal to each other and a transmitting lens 8 on a point of measurement 9 through which fluid passes. In the point of measurement 9 two orthogonal interference fringe systems are formed as those produced by the laser Doppler anemometer known from DE-OS-No. 34 35 423.

The laser beams 10a, 11a of the laser diode 1a, after having passed through the point of measurement 9, are refocussed through a lens 12 on a photodetector 13a, and the beams 10b, 11b, after having passed through the point of measurement 9 and after deflection with a mirror 32, are refocussed through a diaphragm stop 33 which allows only the beams 10b and 11b to pass.

If particles of the flow velocity v (17), which are entrained by the fluid, pass through the point of measurement 9, the light scattered by these is trapped by scattered light traps 14, 33 and only the beams 10b, 11b or 10a, 11a directly impinge on the detectors 13b or 13a.

The photodetectors 13a, 13b generate corresponding signals 15a, 15b which embody the velocity information as difference signals $I^i$ between the incident light intensity $I^i_o$ and the scattered light intensity $I^i_{scatter}$ emitted into the whole solid angle $4\pi$, where $$I^i = I^i_o - I^i_{scatter}; i = 1,2.$$

With respect to a system of coordinates 31, a photodetector 13a detects the x-component of the velocity vector v (17) and a photodetector 13b the y-component of the velocity vector v (17) orthogonal to it.

For the precise positioning of a corresponding photodetector 13a, 13b, a DC component can be obtained from a respective signal 15a, 15b.

According to the arrangement in FIG. 4, the light emitted by a laser diode 1c is focussed with a focussing lens system 6c through a lens 8 into the point of measurement 9; after having passed through the latter, it is reflected with a lens 12 and two deflection mirrors 16, 27 on the point of measurement 9 and refocussed into the point of measurement 9 with the aid of a lens 28. In the point of measurement 9, a fringe system is then formed perpendicular to the z-axis of the system of coordinates 31.

After having passed through the point of measurement 9, by means of a lens 8 the laser beam 10c is now guided parallel to the z-axis of the system of coordinates 31 and focussed on a photodetector 13 with a lens 29. The scattered light trap 30 serves to eliminate scattered light.

The photodetector 13c then generates signals 15c which embody the velocity information for the z-component of the velocity vector v (17) as difference signal I between the incident light intensity $I_o$ and scattered light intensity $I_{scatter}$ emmited into the whole solid angle $4\pi$ as AC component.

A DC component for the precise positioning of a photodetector 13c can be taken from the signal 15c.

Figure 6:
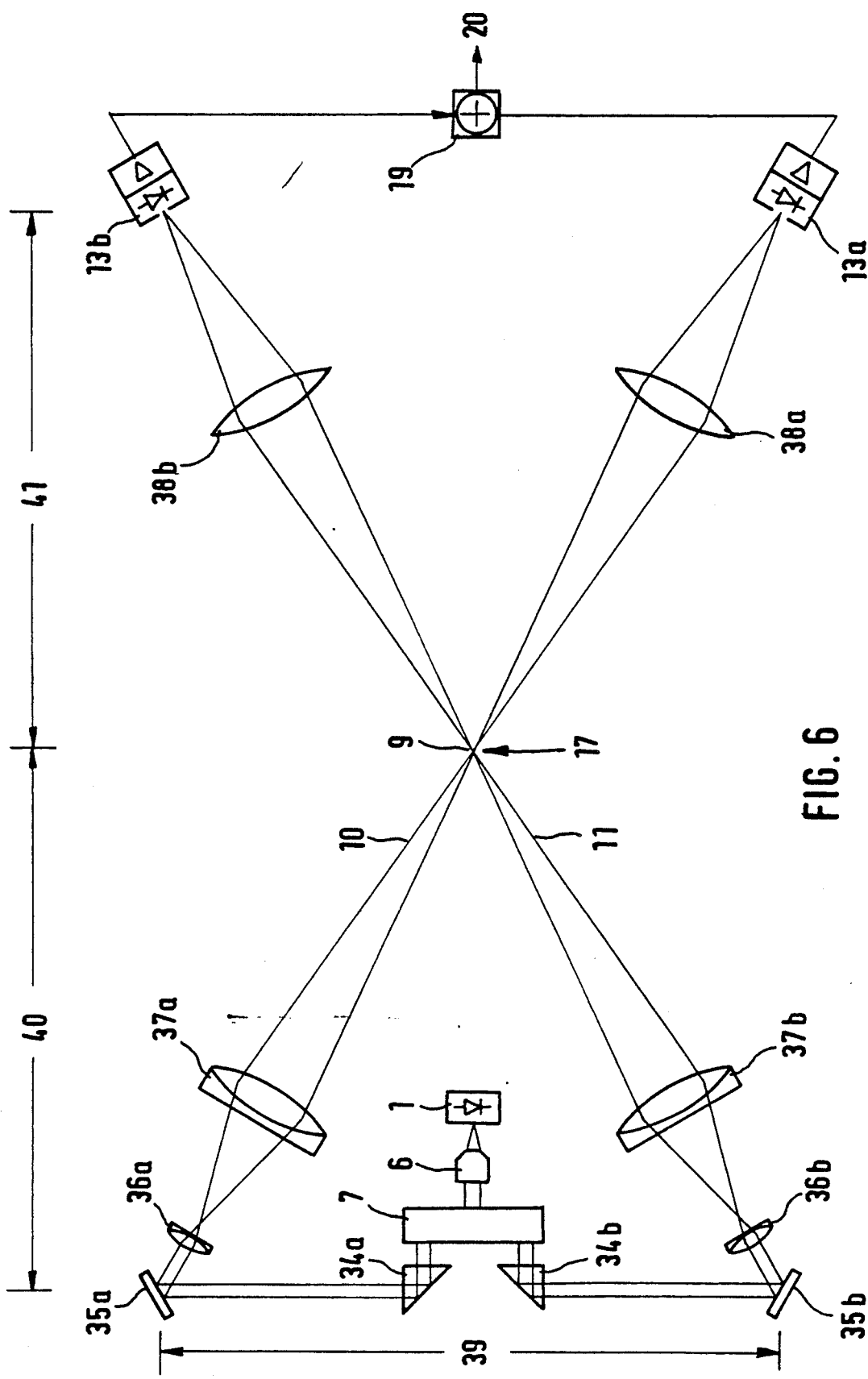
FIG. 6: shows an arrangement of a laser Doppler anemometer similar to FIG. 2, with expansion lens system for velocity measurement over long distances.

FIG. 6 shows an extension of the arrangement represented in FIG. 2.

The extension consists in that after having been split, the laser beams 10, 11 are deflected through a prism 34a and 34b and are deflected again at a distance 39 through a deflection mirror 35a and 35b and are subsequently expanded with the aid of an expansion system 36a and 37a/36b and 37b.

The point of measurement 9 (point of intersection) is situated at a distance 40 from the base of the optical path which is generally selected great as compared with the beam spacing 39.

In the point of intersection 9, an interference fringe system is produced. Particles which pass through the point of measurement 9 with the velocity v (17) scatter light from the two partial beams 10 and 11 into the solid angle $4\pi$.

Behind the point of intersection, the two divergent partial beams are focussed by one lens each 38a and 38b on a semiconductor photodiode 13a and 13b, respectively. The detectors are situated at a distance 41 behind the point of measurement 9 (point of intersection), which can be freely selected and is limited only by the size of the existing collecting lens systems 38a and 38b.

In analogy to FIG. 2, the signals of the photodetectors 13a and 13b are electrically amplified and subsequently added in an adding stage 19 to form the signal 20.

Figure 7:
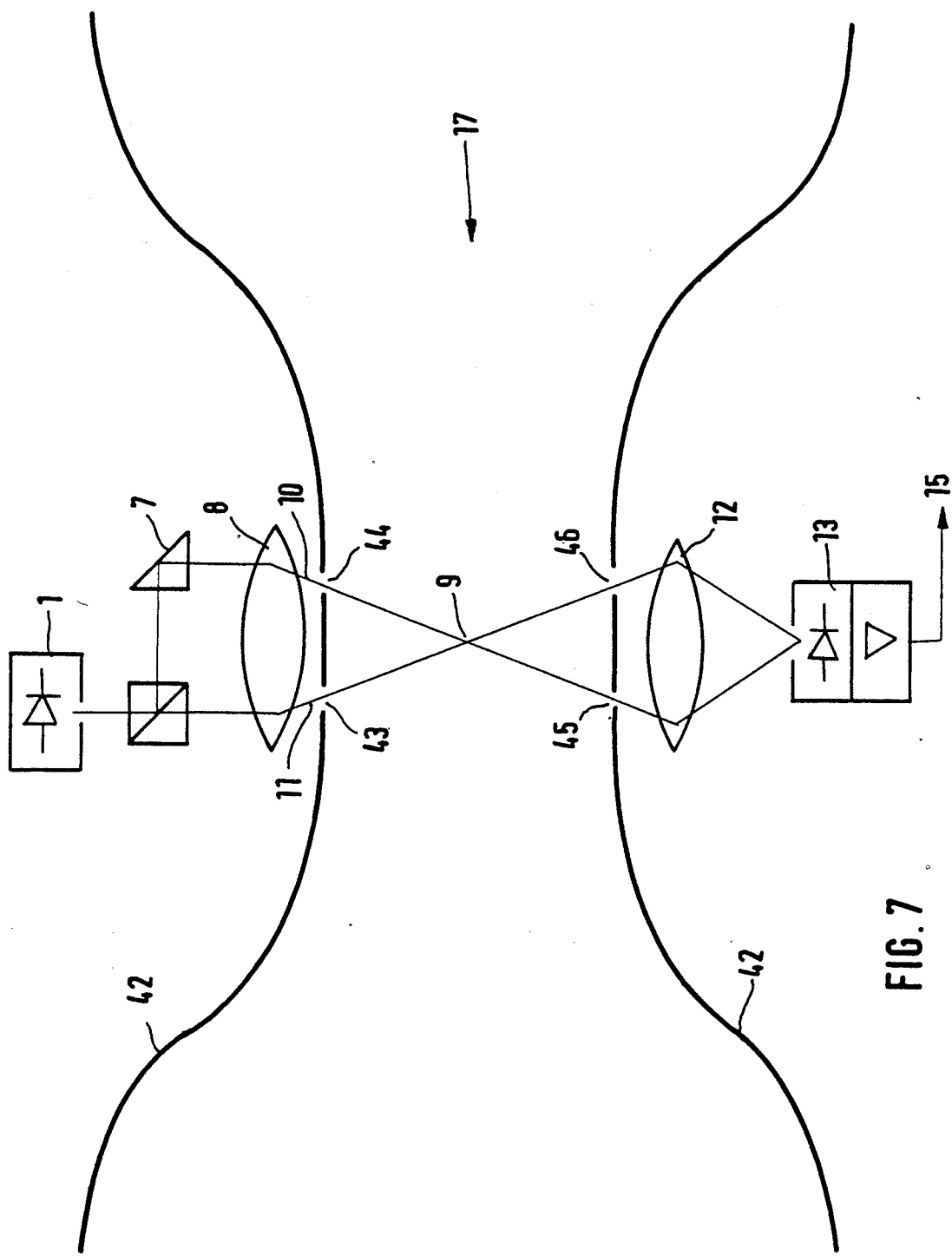
FIG. 7: shows an arrangement of a laser Doppler anemometer similar to FIG. 1 for the velocity measurement of fluid flow delimited by walls and for the measurement of the volume flowrate by measurement of the velocity in a characteristic point.

FIG. 7 shows a special application of the arrangement according to FIG. 1. Here the laser beams 10, 11 are focussed in the point 9 through boreholes 43, 44 of a wall 42.

The beams 10, 11 are further guided through boreholes 45, 46 of a wall 42 and refocussed through a lens 12 on a photodetector 13.

The required boreholes can be kept small and additionally filled with material of adequate optical refractive index which can replace lenses 8 and 12. The optical access to the point of measurement 9 can thus be kept very small.

If the contour of the wall 42 is adequately designed, the flow profile of the fluid will be such that the volume flow through the area which is limited by the wall 42, is obtained by measuring the representative velocity v (17) in the point of measurement 9. The wall 42 can be devised as simple channel, as nozzle or, for example, as orifice plate or throat.

Figure 8:
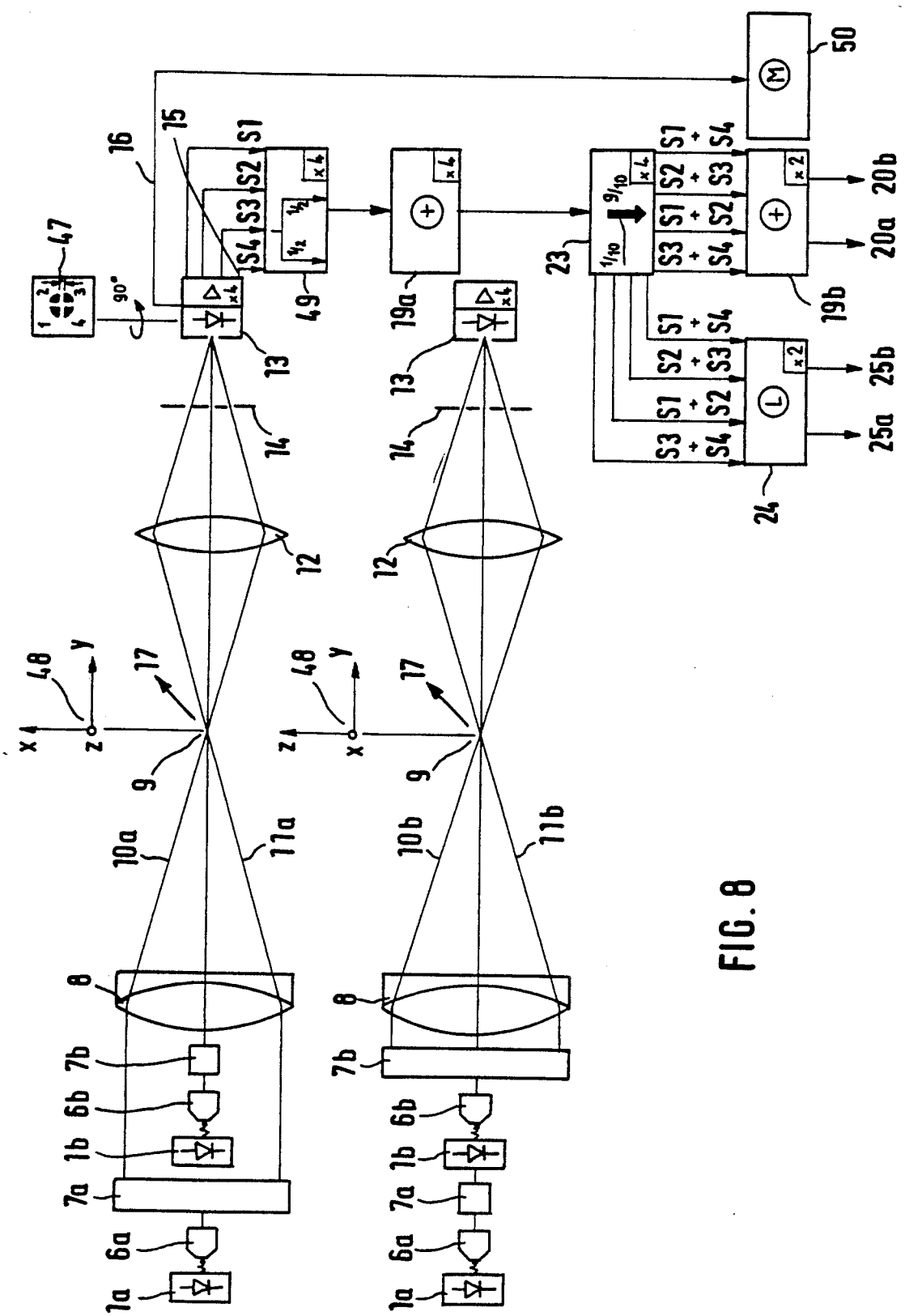
FIG. 8: shows an arrangement of the laser Doppler anemometer similar to FIG. 3 for the simultaneous measurement of the velocity and direction of a fluid flow in two orthogonal components with a suitable four-quadrant photodetector.

FIG. 8 shows an extension of the arrangement represented in FIG. 3.

Through focussing lens systems 6a, 6b and beam splitters 7a, 7b arranged orthogonal to each other and a lens system 8, light emitted by laser diodes 1a, 1b is concentrated in a definite range (point of measurement) 9 of a particle-containing fluid in such a way that two interference fringe systems which are orthogonal to each other are formed orthogonal to the axes x and z of a system of coordinates 48.

The laser beams 10a, 11a of a laser diode 1a progressing from a range (point of measurement) 9 and the beams 10b, 11b of a laser diode 1b are refocussed through a lens system 12 on a four-quadrant photodetector module 13 in such a way that one half of the above-mentioned interference fringe systems for the x-direction of a system of coordinates 48 is imaged on the quadrant combinations (1+2) and (3 +4) and the other half for the z-direction on the quadrant combinations (1+4) and (2+3) according to the arrangement 47.

When a particle contained in the flowing fluid flies through the point of measurement 9 with the velocity v (17), it scatters light into the whole solid angle $4\pi$. This scattered light is trapped by a scattered light trap 14 with respect to a four-quadrant photodetector module 13. The desired information about the velocity components of the velocity vector v (17) in the z and x-direction of a system of coordinates 48 is then contained in the signals 15 (Si; i = 1, . . . ,4) of a four-quadrant photodetector module 13 as AC components, each of which is superimposed on a DC component and represents the difference signal $I^i$ between the incident light intensity $I^i_o$ and scattered light intensity $I^i_{scatter}$ of each i-th quadrant according to arrangement 47.

In anology to FIG. 3, with respect to the above-mentioned quadrant combinations, the corresponding combinations of the signals 15 (Si; i = 1, . . . ,4) are produced by means of a quadruple power divider 49 and a quadruple adding unit 19a as signal (S1+S2) for the quadrants (1+2) and signal (S3+S4) for the quadrants (3+4) for the x-direction, as signal (S1+S4) for the quadrants (1+4) and signal (S2+S3) for the quadrants (2+3) for the z-direction of the velocity vector v (17) of a flow.

With reference to FIG. 3, the flow parameters "direction" and "velocity" of a flow are generated by means of a quadruple directional coupler 23 via a signal processing unit with a dual logic 24 and a dual adding unit 19b both for the x-direction of a system of coordinates 48 as signals 25a and 20a and for the z-direction in the form of the signals 25b and 20b.

A DC component 16 is used to control the optimized adjustment of a four-quadrant photodetector module 13 through a controlled traversing slide 50.

We claim:

1. A laser Doppler anemometer arrangement comprising at least one laser Doppler anemometer for measuring the velocities of objects moving through a point of measurement, said laser Doppler anemometer comprising:

a laser beam source for emitting a laser beam;

a deflection lens system for producing at least two partial laser beams from the laser beam;

a collecting lens system for focussing at least one of the two partial laser beams on a fluid to be measured;

at least one photodetector for detecting the partial laser beams progressing from the point of measurement, the partial laser beams being intensity-modulated by moving objects progressing from the point of measurement;

means for refocussing said intensity modulated laser beams on a semi-conductor photodiode;

means for preventing scattered light fractions from the point of measurement from reaching the photodetector, wherein the coherence length of the laser beam source enables at least one of the two partial laser beams, after having passed through the point of measurement and after having then been deflected to be focussed on the point of measurement and subsequently refocussed on the semi-conductor photodiode.

2. A laser Doppler anemometer arrangement as claimed in claim 1, wherein a plurality of the laser Doppler anemometers are arranged orthogonal to each other for the simultaneous measurement of three orthogonal velocity components of the measured objects at one wavelength, said arrangement further comprising at least one double photodiode for direction detection of the measured objects.

3. A laser Doppler anemometer arrangement including at least one laser Doppler anemometer for measuring the speeds of objects at a measurement location, said laser Doppler anemometer comprising: a laser beam source for emitting a laser beam; a beam splitter to divide the laser beam into two partial beams; collecting optics to focus the two partial beams on the measurement location; and at least one photodetector disposed so as to detect a first laser beam proceeding from the measurement location and intensity-modulated by at least one of the measured objects, the anemometer also including refocussing optics disposed in the path of the intensity-modulated laser beam for direct refocussing of the laser beam on the photodetector, and a scattered light trap being provided to prevent portions of scattered light emitted from the measurement location from reaching the photodetector.

4. A laser Doppler anemometer arrangement according to claim 3, further comprising an additional photodetector being disposed in a path of a second laser beam which proceeds from the measurement location and which is intensity-modulated by at least one of the measured objects; optics for direct refocussing of the second intensity-modulated laser beam on the additional photodetector; an additional scattered light trap for preventing portions of the scattered light from reaching the additional photodetector; and means for generating a summation signal from electrical output signals of the photodetectors.

5. A laser Doppler anemometer arrangement according to claim 4, further comprising a plurality of small openings provided in walls surrounding the objects at the measurement location, the plurality of small openings serving as scattered light traps through which the laser beams are directed.

6. A laser Doppler anemometer arrangement as claimed in claims 3 or 4, further comprising at least one additional lens system, wherein velocities of moving objects in the point of measurement are measured at a very great distance using said at least one additional lens system.

7. A laser Doppler anemometer arrangement according to claim 3, further comprising means for refocussing at least said first laser beam proceeding from the measurement location and intensity-modulated by at least one of the measured objects on a double photodiode for detection of a direction of movement of the measured objects in addition to their speed.

8. A laser Doppler anemometer arrangement as claimed in claim 7, wherein at least two of the laser Doppler anemometers are arranged orthogonal to each other; said arrangement further comprising a four-quadrant photodetector, wherein two orthogonal velocity components of moving objects at the measurement location are simultaneously measured with said four-quadrant photodetector.

9. A laser Doppler anemometer arrangement according to claim 3, further comprising a plurality of small openings provided in walls surrounding the objects at the measurement location, the plurality of small openings serving as scattered light traps through which the laser beams are directed.

10. A laser Doppler anemometer arrangement as claimed in claims 3 or 9, wherein the measurement location is defined by a curved wall with corresponding small boreholes, the curved wall being so defined that a homogeneous velocity distribution of the objects at the point of measurement is produced by a contraction ratio of the curved wall so that by measurement of a representative velocity in the point of measurement, a flow-rate is obtained.

11. A laser Doppler anemometer for measuring speeds of measured objects at a measurement location comprising: a laser beam source for emitting a laser beam; collecting optics for focussing the laser beam on the measurement location; a photodetector for detecting the laser beam after it passes through the measurement location and is intensity-modulated by at least one of the measured objects; means for deflecting and focussing the laser beam proceeding from the measurement location back to the measurement location; optics for direct refocussing of the laser beam on the photodetector; and a scattered light trap for preventing portions of scattered light emitted from the measurement location from reaching the photodetector, the scattered light trap being disposed in the path of the intensity-modulated laser beam proceeding from the measured object.

* * * * *